US012286366B2

(12) United States Patent
Wolschrijn et al.

(10) Patent No.: US 12,286,366 B2
(45) Date of Patent: Apr. 29, 2025

(54) ANOLYTE AS AN ADDITIVE FOR WASTEWATER TREATMENT

(71) Applicant: 73CB6 B.V., Arnhem (NL)

(72) Inventors: Paul Robert Wolschrijn, Ede (NL); Eduard Alexander Valk, Lathum (NL)

(73) Assignee: PWW HOLDING LTD., Naxxar (MT)

( * ) Notice: Subject to any disclaimer, the term of this patent is extended or adjusted under 35 U.S.C. 154(b) by 991 days.

(21) Appl. No.: 17/259,939

(22) PCT Filed: Jul. 26, 2018

(86) PCT No.: PCT/EP2018/070266
§ 371 (c)(1),
(2) Date: Jan. 13, 2021

(87) PCT Pub. No.: WO2020/020459
PCT Pub. Date: Jan. 30, 2020

(65) Prior Publication Data
US 2021/0292195 A1  Sep. 23, 2021

(51) Int. Cl.
| | | |
|---|---|---|
| *C02F 1/46* | (2023.01) | |
| *C02F 1/24* | (2023.01) | |
| *C02F 1/44* | (2023.01) | |
| *C02F 1/461* | (2023.01) | |
| *C02F 1/463* | (2023.01) | |
| *C02F 1/467* | (2023.01) | |
| *C02F 1/52* | (2023.01) | |
| *C02F 9/00* | (2023.01) | |
| *C02F 103/20* | (2006.01) | |
| *C02F 103/22* | (2006.01) | |

(52) U.S. Cl.
CPC .............. *C02F 1/4672* (2013.01); *C02F 1/24* (2013.01); *C02F 1/441* (2013.01); *C02F 1/4618* (2013.01); *C02F 1/463* (2013.01); *C02F 1/5245* (2013.01); *C02F 9/00* (2013.01); *C02F 2001/46185* (2013.01); *C02F 2103/20* (2013.01); *C02F 2103/22* (2013.01); *C02F 2201/4618* (2013.01); *C02F 2303/04* (2013.01); *C02F 2305/023* (2013.01)

(58) Field of Classification Search
CPC .......... C02F 1/4672; C02F 1/24; C02F 1/441; C02F 1/4618; C02F 1/463; C02F 1/5245; C02F 9/00; C02F 2001/46185; C02F 2103/20; C02F 2103/22; C02F 2201/4618; C02F 2303/04; C02F 2305/023; C02F 1/50; C02F 1/38; C02F 1/442; C02F 1/444
See application file for complete search history.

(56) References Cited

U.S. PATENT DOCUMENTS

| | | | | |
|---|---|---|---|---|
| 2004/0099607 A1* | 5/2004 | Leffler | .................. | C02F 1/4672 210/764 |
| 2007/0187261 A1* | 8/2007 | Field | .................... | A47L 11/4083 205/742 |

FOREIGN PATENT DOCUMENTS

| | | |
|---|---|---|
| CN | 101058447 A | 10/2007 |
| CN | 101426734 A | 5/2009 |
| CN | 205873973 U | 1/2017 |
| JP | 2003300074 A | 10/2003 |

(Continued)

*Primary Examiner* — Waqaas Ali
(74) *Attorney, Agent, or Firm* — Rivka Friedman

(57) ABSTRACT

The present invention relates to a process for purification of wastewater. In particular, the present invention pertains to an improved process for purification of wastewater by employing anolyte as an additive.

7 Claims, 1 Drawing Sheet

(56) References Cited

FOREIGN PATENT DOCUMENTS

RU             2090517 C1 * 9/1997
WO    WO-2017216580 A1 * 12/2017 ............. B01D 65/08

* cited by examiner

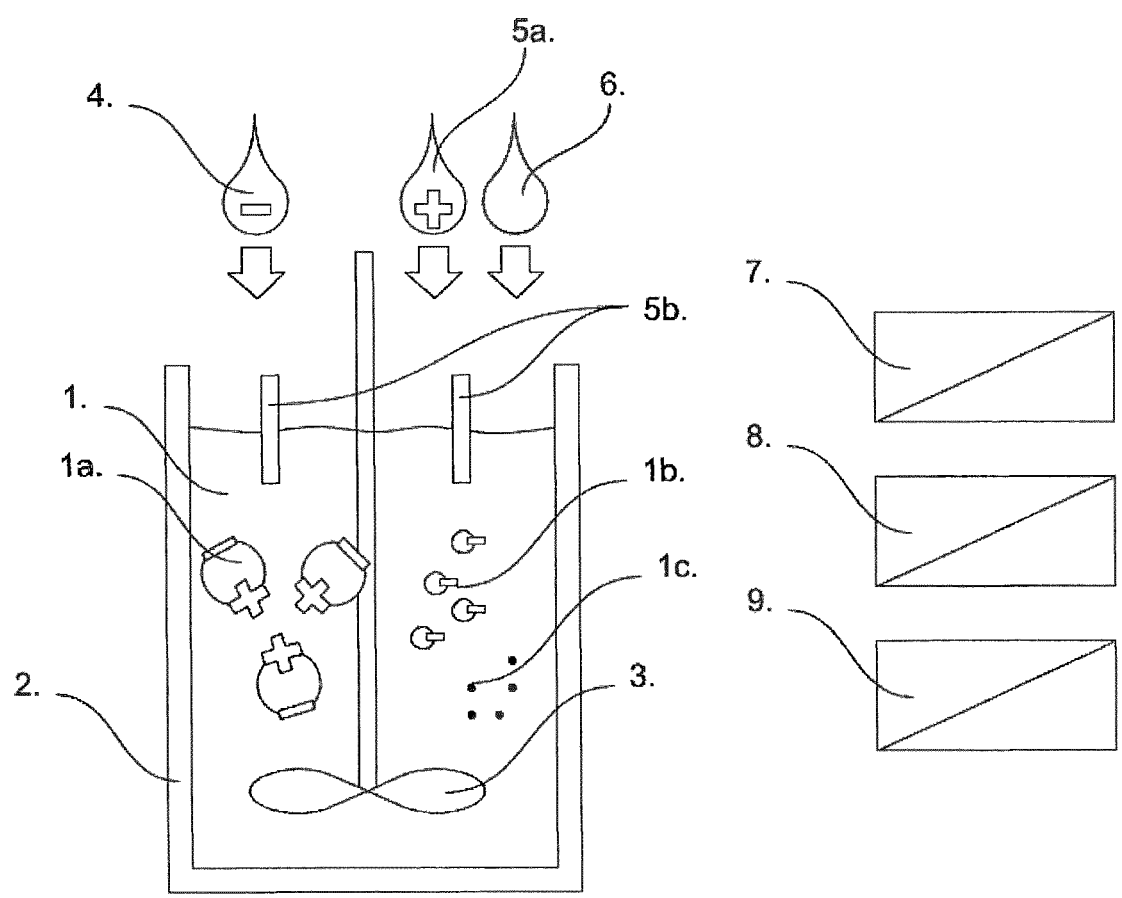

ANOLYTE AS AN ADDITIVE FOR WASTEWATER TREATMENT

FIELD OF INVENTION

The present invention relates to an electrochemical process for purification of wastewater. In particular, the present invention pertains to an improved process for purification of wastewater by employing anolyte as an additive.

BACKGROUND OF INVENTION

Today's world has increasingly greater need for fresh, drinkable water. With the increasing advent of municipal and industrial wastewaters, continuous improvement is needed in the existing purification methods to enable reuse of the contaminated water.

Traditional water treatment plants generally consist of purification steps such as clarification, chemical addition (coagulation and flocculation), filtration, and biological treatment. Clarification refers to the separation of particles (dirt, organic matter, etc.) from the water stream. Chemical addition (i.e. alum, ferric chloride) destabilizes the particle charges and prepares them for clarification either by settling down in the water stream or floating above the water stream. Biological treatment refers to destruction of vegetative forms of harmful microorganisms. The purification methods available are a combination of two or more of the aforementioned techniques in order to obtain satisfactory water purification.

Biological processes of nitrification-denitrification are very difficult to control (pH and temperature for example, effect efficiency very much), generally have a large footprint and have effluent quality not suitable for membrane filtration.

Although globally the main wastewater treatment process is biological, specific chemicals such as coagulants and flocculants are widely used for flock forming to capture pollutants for easy liquid-solid separation. Coagulant and flocculant chemicals are often harmful and toxic and thus represent risks. Further, electrochemical processes using coagulants are effective with pH between 5-8.5, therefore pH correction by adding acids or base, often is an obligatory first treatment step, adding costs and risks to the entire treatment process.

Further, coagulation is affected by the type of coagulant used, its dosage and mass, pH and initial turbidity of the water that is being treated, and properties of the pollutants present. The effectiveness of the coagulation process is also influenced by pretreatments like oxidation. Electrochemical pretreatment with coagulants and flocculants has some limitations. Coagulation itself results in the formation of floc but flocculation is required to help the floc further aggregate and settle. The coagulation-flocculation process removes only about 60%-70% of Natural Organic Matter (NOM) and thus, other processes like oxidation, filtration and sedimentation are necessary to complete the raw water or wastewater treatment.

Processes such as electrocoagulation and electroflocculation require high energy usage and mostly are not economically viable for large scale applications, such as municipal wastewater treatment plants.

Apart from the above processes, few prior art references also discloses employing anolyte and catholyte for waste water purification. For instance, U.S. Pat. No. 7,481,935 wherein the anolyte is used as a biocide and catholyte as biostimulus for biological processes. The patent is focused on animal waste and emphasises the use of anolyte as biocide mainly to control odor at intake and to disinfect vessels. This patent discloses a process wherein the anolyte is sprayed to the outside of the waste a few times an hour to kill bacteria. The catholyte is mentioned as "useful for flocculation, coagulation, washing and extraction". However, in addition to treatment with catholyte and/or anolyte, the patent makes use of classic nitrification-denitrification (a biological) process with anaerobic and aerobic stages, whereby bacteria remove nitrogen, thus making the process very tedious.

Therefore, there is still a need to a wastewater treatment process, which permits achieving purification to a degree which makes it suitable for processing with membrane filtration, at an acceptable cost without employing much of chemicals.

OBJECT OF THE INVENTION

An object of the present invention is to provide a process for the purification of wastewater which permits to achieve water purification to a degree sufficient for it to be suitable for processing with membrane filtration.

Another object of the present invention is to arrive at a process which can be carried out without the need for pH correction during the process.

Yet another object of the present invention is to provide a process which is effective in nitrogen reduction and makes any bacteria or biological process obsolete and makes the water suitable for processing with membrane filtration.

BRIEF DESCRIPTION OF ACCOMPANYING DRAWINGS

FIG. 1 provides a schematic diagram of the wastewater purification according to one of the embodiments of the present invention.

SUMMARY OF THE INVENTION

In one aspect, the present application provides a process for purification of wastewater by subjecting the wastewater to an electrochemical water treatment process in the presence of an anolyte, wherein the anolyte is added as an additive, and the process is carried out without the need for pH correction.

In another aspect the present application provides use of anolyte as an additive for wastewater purification.

DETAILED DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification and appended claims refer to percentages by weight of the total composition.

Thus, before describing the present invention in detail, it is to be understood that this invention is not limited to particularly exemplified systems or method parameters that may of course, vary. It is also to be understood that the terminology used herein is for the purpose of describing particular embodiments of the invention only, and is not intended to limit the scope of the invention in any manner.

The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

It must be noted that, as used in this specification and the appended claims, the singular forms "a," "an" and "the" include plural referents unless the content clearly dictates otherwise. Thus, for example, reference to a "polymer" may include two or more such polymers.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "comprising" "including," "having," "containing," "involving," and the like are to be understood to be open-ended, i.e., to mean including but not limited to.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification and appended claims refer to percentages by weight of the total composition.

The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

It must be noted that, as used in this specification and the appended claims, the singular forms "a," "an" and "the" include plural referents unless the content clearly dictates otherwise.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "comprising" "including," "having," "containing," "involving," and the like are to be understood to be open-ended, i.e., to mean including but not limited to.

In one aspect, the present application provides a process for purification of wastewater by subjecting the wastewater to an electrochemical water treatment process in the presence of an anolyte, wherein the anolyte is added as an additive, and the process is carried out without the need for pH correction.

The process comprises the steps of:
a) providing the wastewater;
b) adding and mixing the anolyte to the wastewater to form a mixture;
c) optionally carrying out coagulation or flocculation of the mixture obtained in step b);
d) separation of solid waste from liquid mixture.

The wastewater as an aqueous medium may be collected in a vessel/container/tank. Solid waste can be treated by suspending them into the aqueous medium before starting the treatment. This forms an influent for the treatment process.

Anolyte is a form of electrolysed water comprising ions and radicals of $H_2O$, $H^+$, $H_3O^+$, $O_2$, $OH^-$, $HOCl$, $ClO^-$, $HCl$, $Cl^-$, $HClO_3$. The anolyte form of water with 100-6000 mg/L or more free active chlorine (FAC) may be produced in a cell comprising anode and cathode, separated by an ion-exchanging membrane, for example as described by EP 0922788 B1 (Naida and Pushnyakov), GB 2449735 A (Iltsenko and Naida), WO2010055108A1 (Quadrelli and Ferro), EP 1969159 B1 (Bohnstedt et al).

The anolyte form of electrolyzed water may be added to the influent and mixed by stirring, shaking or using a mixing device. The quantity of the anolyte may range from 5-300% of the influent volume depending on the influent type and the amount of impurities in the influent.

After treatment with the anolyte, the treated mixture may undergo further processes of coagulation and flocculation. The coagulation and flocculation steps are performed depending on the influent type that is being treated.

Known processes for coagulation, such as electrocoagulation, or chemical coagulation may be employed.

Chemical coagulation may be conducted in the presence of organic or inorganic coagulants. Organic coagulants include but are not limited to polyamines, melamine formaldehydes and tannins. Inorganic coagulants include but are not limited to aluminum sulphate, aluminum chloride, sodium aluminate, ferric sulfate, ferrous sulfate, ferric chloride, ferric chloride sulfate, polyacrylamide, poly aluminum chloride, nonionic polyacrylamide, anionic polyacrylamide, hydrated lime and magnesium carbonate.

Chemical coagulation by dosing ferric chloride, or aluminium chloride, or polyaluminum chloride, or electrocoagulation (processing a direct current source between metal electrodes immersed in wastewater with reaction time of 10-90 minutes) or a combination with electrocoagulation may be used. Generally coagulant is added to the mixture and mixed by stirring, shaking or using a mixing device. Iron and aluminium salts are the most widely used coagulants but salts of other metals such as titanium and zirconium have been found to be highly effective as well.

Coagulant quantities for wastewater which is already treated with the anolyte is (surprisingly) found to be 15-100% less than the quantity of coagulant when used without adding the anolyte but resulting in a liquid of superior quality. In most of the prior art processes, coagulation is a prerequisite for effective flocculation and liquid-solid separation. In accordance with the present disclosure, the coagulants bring a positive charge into the influent which destabilizes the colloidal forces between the particles present in the wastewater, thereby enabling effective coagulation of the wastewater particles as a result of VanderWaals force.

In accordance with an embodiment, the flocculants used in the process include but are not limited to alum or alum or aluminum chlorohydrate, ferrous chlorohydrate, or any other commonly used anionic or cationic flocculants known in the art.

Known processes for flocculation, for example polyelectrolyte (PE) dosing, may be used. Flocculant may be added to the mixture and mixed by stirring, shaking or using a mixing device. Flocculant quantity with using anolyte is (surprisingly) found to be 20-60% less than the quantity of flocculant when used without adding anolyte. The process results in a liquid of superior quality resulting in a more cost effective, environmentally friendly and safer process.

The dosage of specific chemicals such as coagulants and polyelectrolytes used for floc forming to capture pollutants and to ease liquid-solid separation, is much lower than in conventional biological processes. With increased efficacy of coagulant and flocculant, subsequent processes can be dimensioned lower in capacity and size while producing the same desired COD-, N-, MLSS and bacteria count levels, reducing costs.

The flocs formed as a suspended solid layer are separated by known separation techniques. Known methods of separation can be used, such as flotation, sedimentation or filtration, to separate solid (sludge) from liquid. Processes, for example pressing, electrophoresis or centrifuging, can also be used. The remaining liquid resulting from the liquid-solid separation can be treated with the same process (using anolyte before coagulation-flocculation).

In a specific embodiment, the use of flocculant is (surprisingly) not necessary, as floc quality after dosing coagulant permits effective liquid-solid separation using known methods.

The process can be carried out without the need for pH correction. The pH maintained during the process varies depending on the nature of the contaminants. Not having to correct pH using acids or base, results in a more cost effective, simple and safer process.

In an embodiment, the process can be repeated to increase capture of suspended solids, colloidal particles and solved substances, resulting in a liquid even better suitable for further processing using standard filtration technology such as nanofiltration or osmosis.

In a further specific embodiment, the process results in water purification to a degree sufficient for it to be suitable for processing with membrane filtration without the need to perform the coagulation and flocculation steps.

Efficacy of using anolyte with or without standard coagulation-flocculation can be expressed in reduction of chemical dosage or electrocoagulation duration (thus energy consumption). Effluent quality generally is expressed in COD and N-Kj (Kjeldahl) as discharge fees are often based on these parameters; and also suitability for processing with modern filtration techniques such as nanofiltration and reverse osmosis, whereby the latter results in reusable and drinkable water.

The anolyte form of electrolyzed water can be produced in large quantities at low cost, so that large scale application of this process for industrial or municipal wastewater treatment is viable. The process is applicable to highly polluted wastewater types that are not allowed to be discharged into biological treatment systems, like certain chemically polluted waste streams. The process is thus more versatile than the conventional processes.

The process presented in FIG. 1, represents the process as follows: the polluted aqueous waste stream (1) containing suspended solids (1a), colloidal particles (1b) and solved substances (1c) is collected in a tank or basin (2). Anolyte form of electrolyzed water (4) is added and mixed subsequently and/or simultaneously with the aqueous waste stream (1); the amount of added electrolyzed water depends on the nature of the contaminants; the electrolyzed water originates from the electrolyzed water reactor (7) and/or from a solid-liquid separation device (9) as reuse (still with some active anolyte). The anolyte form of electrolyzed water (4) with ions and radicals $H_2O$ $H+H_3O^+$ $O_2$ $OH^-$ $HOCl$ $ClO^-$ $HCl$ $Cl^-$ $HClO_3$ is generated in the electrolyzed water reactor (7) using a combination of water, salt (NaCl) and electricity. The ions and radicals present in the anolyte form of electrolyzed water (4) have oxidizing capacity, destroying certain impurities. The ions and radicals present in the anolyte form of electrolyzed water (4) charge the liquid and polarize the charges of the impurities, forcing suspended solids and solved substances to form minute flocs within seconds. The input water used by the electrolyzed water reactor (7) is fresh water and/or effluent from a filtration device (8). Standard floc forming processes such as coagulant (5a)-flocculant (6), electrocoagulation (5b), electroflotation, etc. are applied.

The advantageous effects of invention combined with lower costs to build and operate, make the said invention applicable to both municipal and industrial applications, irrespective of the climatic conditions and regions where water reuse is required. The present invention is simple, inexpensive, easily controllable (dosing more or less), is compact and results in effluent very suitable for reverse osmosis.

The purification is carried out with the primary goal to capture suspended solids, colloidal particles and solved substances, and secondary goal to make it suitable for further processing by membrane filtration.

In another aspect the present application provides the use of anolyte as an additive for wastewater purification.

The anolyte form of electrolyzed water, when used as an additive to wastewater, before, together or after application of a coagulant-flocculant, results in much lower dosage of coagulants and flocculants. The coagulant can be regarded as a 'pre-charger', the anolyte can be regarded as 'pre-pre-charger' and oxidiser at the same time, improving the entire treatment process. Where conventional application of coagulant-flocculant is not successful, using anolyte with coagulant-flocculant is able to treat this polluted wastewater. The process results in significant reduction of dosing chemicals possible which is 'unexpected'. The process results in a significant reduction of nitrogen level ranging from 40% to 98.8% in wastewater.

The present invention makes use of anolyte and its chemical charge to improve chemical processes, having no subsequent biological processes such as nitrification and denitrification. Apparently, the anolyte dosing prior to along with or after treatment with the coagulant and flocculant reduces COD and nitrogen levels so very well, that after liquid-solid separation the liquid can be processed with standard reverse osmosis equipment to result in drinkable water.

The anolyte is not used as coagulant or flocculant, but is used just to make those processes possible, more efficiently and more effectively.

The effects of adding anolyte have been unexpected. Using anolyte as additive in wastewater treatment has proven to have long-felt but unsolved needs of reducing chemical dosage.

The anolyte serves as a cheap additive (made from water, sodium chloride and some electricity), that is environmentally friendly, completely safe, non-toxic and non-irritant, that is applicable where traditional chemicals fail to produce the desired results or can't be applied at all, that charges impurities so that significant lower dosage of both coagulant and flocculant is needed, that will oxidise harmful impurities (due to the radicals in anolyte) and dissolved substances, that lowers the quantity of suspended solids significantly more than using coagulant-flocculant only, that makes pH adaptation of incoming wastewater obsolete (saving costs and effort), that has easily scalable production quantity so can be used on small and large treatment plants, that makes biological treatment obsolete, that makes possible to treat more types of wastewater than with coagulant-flocculant only.

The anolyte gives combined properties of oxidiser and pre-charger in a liquid form (with benefits of thorough contact with impurity particles due to the volume). By using anolyte in accordance with the invention, it has been shown that the process is insensitive to pH of the influent. The pH need not be corrected to a specific value during the process.

The inventors have found that anolyte has specific properties to be used for wastewater treatment. When added to wastewater in certain amounts (varying from 5-300% of influent volume) treatment steps such as coagulation, flocculation and electroflotation are ameliorated.

The process of the present invention is completely harmless and environmentally friendly oxidation technique, not being hazardous, such as ozonization or peroxide additives.

The use of anolyte as additive has been tested on raw sewage sludge, pig slaughterhouse, wastewater from a PET bottles Recycling Company, wastewater from a grass biorefining company, chemical wastewater, agricultural wastewater (manure and digestate), wastewater of Municipal Wastewater Treatment plant, manure of breeding pigs, sows and meat pigs, effluent from a manure digester, centrate from a decanter, industrial wastewater treatment plant, heavily contaminated chemical wastewater of a textile chemicals plant and wastewater from blood mill and many other sources.

The following examples are provided to better illustrate the claimed invention and are not to be interpreted in any way as limiting the scope of the invention. All specific materials, and processes described below, fall within the scope of the invention. These specific compositions, materials, and processes are not intended to limit the invention, but merely to illustrate specific embodiments falling within the scope of the invention. One skilled in the art may develop equivalent materials, and processes without the exercise of inventive capacity and without departing from the scope of the invention. It is the intention of the inventors that such variations are included within the scope of the invention.

EXAMPLES

Example 1

200 ml of municipal wastewater with COD 1210 mg/L and N-Kj 68 mg/L was collected from the primary settling tank. The COD level of this influent was exceptionally high, average levels COD are 700 mg/L. 40 ml (20% of influent quantity) of anolyte with 700 mg/L FAC was added and stirred. Known methods of coagulation-flocculation were applied: 0.10 ml of coagulant (polyaluminum chloride) was added and stirred. Electrocoagulation was applied for only 10 seconds. Floc forming without dosing flocculant, surprisingly was found to be of such quality that liquid-solid separation was performed by filtration with paper and sieve. The resulting liquid had COD 86 mg/L (an unusually high reduction of 93% in a first treatment step) and N-Kj 0.8 mg/L (an unusually high reduction of 98.8% without using biological processes)(analysis by Merieux Nutrisciences, rapport ID 15796490). Industry standard of coagulant dosing quantity (without using anolyte) was 5.0-10.0 ml/L. Industry standard of effluent quality after the first settling tank is reduction of COD with 35% and no significant nitrogen reduction (nitrogen levels are reduced by further treatment steps of biological nitrification-denitrification). The effluent quality of municipal wastewater treatment plants (compliant with the European Union Municipal Wastewater Directive with COD<125 mg/L, annual average N-Kj<10 mg/L and TSS<30 mg/L) usually is not suitable or economically viable for reverse osmosis and discharged into nature. Effluent quality using anolyte (without using biological nitrification-denitrification) was found to be fit for further processing with reverse osmosis resulting in reusable and drinkable water.

Example 2

A pig slaughterhouse has a daily quantity of 1200 $m^3$ of wastewater with an average COD 5740 mg/L and N-Kj 718 mg/L. A coagulation-flocculation process is applied in a dissolved air flotation (DAF) unit resulting in liquid-solid separation. A COD reduction of 75%, results in DAF effluent of COD 1435 mg/L and nitrogen reduction of 40% in DAF effluent of N-Kj 431 mg/L. These reduction values are regarded by industry experts as an optimal result of capturing the suspended solids, colloidal particles and solved substances, using modem technology, before further processing the liquid in a biological treatment plant. Repeatedly processing wastewater in a dissolved air flotation unit is not common practice, as capturing suspended solids, colloidal particles and solved substances a second time is regarded to be not effective as a second liquid-solid separation is not viable. The pig slaughterhouse wastewater was processed in two ways:

I 100 ml of wastewater was collected. 100 ml of anolyte with 700 mg/L FAC was added and mixed. pH was not corrected with any chemical additive. Coagulation was performed by dosing and mixing 0.1 ml polyaluminiumchloride and electrocoagulation for 20 seconds. Flocculation was performed dosing and mixing 0.15 ml polyelectrolyte: floc was formed and liquid was separated from solid using paper and sieve. The resulting liquid was analysed to have COD 270 mg/L. The COD reduction using anolyte, coagulant and flocculant therefore was 95%, compared to an industry standard when using coagulant, pH corrector (NaOH) and flocculant of 75%.

II 100 ml of dissolved air flotation (DAF) effluent was collected. 25 ml (25% of influent quantity) of anolyte with 700 mg/L FAC was added and stirred. 0.05 ml of coagulant was added and stirred. 0.06 ml of flocculant (polyelectrolyte, 0.2% solution) was added and stirred, surprisingly resulting in a visually clear liquid (indicating low TSS) and distinct liquid-solid separation suitable for flotation. Processing this liquid with a small reverse osmosis unit was found to be without any problems and having high flux.

Example 3

The decanter effluent, also called Centrate, with COD 720 mg/L and NKj 705 mg/L (Laboratory Merieux analysis 16270973) was collected. After treatment using anolyte with 700 mg/L FAC plus known (electro)coagulation-flocculation processes the liquid had COD 130 mg/L, N-Kj 264 mg/L (Laboratory Merieux analysis 16270977) and was visually very clear (indicating low TSS). Processing this liquid with a small household reverse osmosis unit was found to be without any membrane flux issues and resulted in COD 33 mg/L and N-Kj 53 mg/L (Laboratory Merieux analysis 16270974). Using a professional reverse osmosis unit is expected to result in lower values of COD and Nitrogen (Kjeldahl).

adding 40% anolyte. The mixture was visually less clear due to oxidation and forming of minute flocs of colloidal parts was obtained (Sample 3).

Reference for ORP level Table 3:

| ORP Level (mV) | Application |
| --- | --- |
| 0-150 | No practical use |
| 150-250 | Aquaculture |
| 250-350 | Cooling towers |
| 400-475 | Swimming Pools |
| 450-600 | Hot Tubs |
| 600 | Water Disinfection |
| 800 | Water Sterilization |

TABLE 1

| Chemical dosage in l/m³ influent | Municipal waste water referenc | Municipal waste water + anolyte | Municipal waste water referenc | Municipal waste water + anolyte | Slaughter house best value | Slaughter-house reference | Slaughter house using anolyte | Slaughter house using anolyte |
| --- | --- | --- | --- | --- | --- | --- | --- | --- |
| Influent type | Primary settling* | Primary settling | Centrate | Centrate | DAF Influent | DAF Influent | DAF Influent | DAF effluent |
| COD mg/L N-Kj | 1210 68 | 1210 68 | 720 705 | 720 705 | 5740 718 | 5740 718 | 5740 718 | |
| Coagulant such as FeCl (42%) PAC | 10.0 l/m³ | 0.5 l/m³ | | 2.0 l/m³ | 0.72 l/m³ | 2.4 l/m³ | 1.0 l/m³ | 0.75 l/m³ |
| pH corrective chemicals such as N₂OH (33%) | — | — | — | — | 0.50 l/m³ | 2.0 l/m³ | — | — |
| Flocculant such as polyelectrolyte Effluent quality | 1.15 l/m³ | — | | 2.5 l/m³ | 2.6 l/m³ | 3.2 l/m³ | 1.5 l/m³ | 0.6 l/m³ |
| COD reduction | 35% | 93% | 35% | 82% | 75% | 75% | 95% | |
| N (Kjeldahl) | 0% | 98.8% | 0% | 63% | 40% | 40% | | |
| Remarks | Not fit for processing with | Ready for processing with | Not fit for processing with | Ready for processing with | Not fit for processing with | RO** processing not | Ready for processing with | Ready for processing with |

Conclusions:
  Generally, for effective coagulation-flocculation pH correction is regarded a prerequisite by industry experts. As per the process disclosed using anolyte as precharger results in reduced dosing of coagulant and/or reduced electrocoagulation time and reduced dosing of flocculant, whereby effluent quality is unexpectedly high and pH correction was surprisingly found to be unnecessary.
  When using anolyte, the process of capturing suspended solids, colloidal particles and solved substances using conventional coagulation-flocculation processes, can be repeated to increase effluent quality.
  When using anolyte in one or more passes, the resulting effluent can be of a quality suitable for filtration processes such as nanofiltration or reverse osmosis (making biological treatment unnecessary).

Example 4

Water from a ditch which was visually not clear and with medium pollution level (Sample 1) was taken from a farm in Ede, The Netherlands, and dated Apr. 7, 2018. Suspended solids were clearly visible.
  Said influent was treated as follows:
    filtered by hand using 10 layers of paper (Sample 2)

TABLE 2

Analysis of Samples 1 to 3

| Description | Ditch water (Sample1) | Filtrated water (Sample 2) | Filtrated water + Anolyte (Sample 3) |
| --- | --- | --- | --- |
| Anolyte dosage in % of influent volume | 0% | 0% | 40% |
| Layers filtration | 0 | 10 | 10 |
| Nitrogen (ammonium) in mg/L | 0.81 | 0.84 | 0.00 |
| Turbidity in ppT | 0.56 | 0.56 | 0.56 |
| EC (conductivity) in mS | 1.12 | 1.13 | 1.23 |
| Redox (ORP) | 293 | 667 | 705 |
| pH | 7.15 | 7.17 | 7.4 |
| Temperature in Celcius | 24.7 | 24.9 | 24.5 |
| O2 level mg/L | 0.5 | 2.5 | 5.1 |

We claim:
  1. A process for treatment of wastewater comprising, subjecting the wastewater to an electrochemical water treatment process, wherein the electrochemical water treatment process is performed by membrane electrolysis, in the presence of an anolyte, wherein the anolyte is added as an additive, wherein the anolyte is a form of electrolysed water comprising ions and radicals of $H_2O$, $H^+$, $H_3O^+$, $O_2$, $OH^-$, HOCl, $ClO^-$, HCl, $Cl^-$, $HClO_3$, wherein the process is composed of the steps of:
- a) providing wastewater;
- b) adding and mixing the anolyte to the wastewater to form a mixture;
- c) carrying out coagulation or flocculation of the mixture obtained in step b);
- d) separation of solid waste from liquid;

wherein the anolyte when added before coagulation results in formation of particles or flocs.

2. The process as claimed in claim 1, wherein the anolyte is added in the range of 5 to 100% of the volume of the wastewater.

3. The process as claimed in claim 1, wherein the coagulation is conducted by electrocoagulation or chemical coagulation or a combination of both.

4. The process as claimed in claim 3, wherein the chemical coagulation is conducted in the presence of a coagulant selected from organic or inorganic coagulant.

5. The process as claimed in claim 4, wherein the inorganic coagulant is selected from the group consisting of: iron salts, aluminium salts, titanium salts, and zirconium salts.

6. The process as claimed in claim 1, wherein the separation techniques in step d) include floatation, sedimentation, filtration, electrophoresis, pressing and centrifuging.

7. The process as claimed in claim 6, wherein the filtration is carried out by ultrafiltration, nanofiltration, or reverse osmosis.

* * * * *